United States Patent
Tadaki et al.

(10) Patent No.: US 7,764,346 B2
(45) Date of Patent: Jul. 27, 2010

(54) LIQUID CRYSTAL DISPLAY DEVICE AND ORIENTATION PROCESSING METHOD

(75) Inventors: Shinji Tadaki, Kawasaki (JP); Yoshinori Kiyota, Kawasaki (JP); Toshiaki Yoshihara, Kawasaki (JP); Hironori Shiroto, Kobe (JP); Tetsuya Makino, Kakogawa (JP); Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 11/899,736

(22) Filed: Sep. 7, 2007

(65) Prior Publication Data

US 2008/0002120 A1  Jan. 3, 2008

Related U.S. Application Data

(63) Continuation of application No. PCT/JP2005/004517, filed on Mar. 15, 2005.

(51) Int. Cl.
*G02F 1/1337* (2006.01)

(52) U.S. Cl. .................. 349/129; 349/123; 349/128

(58) Field of Classification Search .......... 349/123, 349/128, 129
See application file for complete search history.

(56) References Cited

U.S. PATENT DOCUMENTS 7,567,335 B2 * 7/2009 Lee et al. .................. 349/187

| 2001/0046341 A1 * | 11/2001 | Nakabayashi ............. 385/14 |
| 2003/0011732 A1 | 1/2003 | Ishihara et al. |
| 2006/0001810 A1 * | 1/2006 | Park ....................... 349/129 |
| 2006/0244888 A1 * | 11/2006 | Ohta et al. ................ 349/141 |

FOREIGN PATENT DOCUMENTS

| JP | 10-048632 | 2/1998 |
| JP | 2000-310779 | 11/2000 |
| JP | 2001-108999 | 4/2001 |
| JP | 2001-337352 | 12/2001 |
| TW | 574521 | 2/2004 |

\* cited by examiner

*Primary Examiner*—Julie-Huyen L Ngo
(74) *Attorney, Agent, or Firm*—Greer, Burns & Crain, Ltd.

(57) ABSTRACT

A liquid crystal display device comprising: a peripheral electrode 31 that is formed around the outside of a display region 1a on a liquid crystal panel 1 and that generates an orientation state that is equivalent to that of the display region 1a; and an inverted electrode 32 that is formed around the outside of the peripheral electrode 31 and that generates an orientation state that has polarity opposite to that of the display region 1a; wherein the peripheral electrode 31 and the inverted electrode 32 have bipectinate construction and are arranged on both sides of a non-oriented buffer region 33. Orientation defects that are generated in a seal are trapped inside the buffer region 33 due to the existence of the peripheral electrode 31 and inverted electrode 32 that have different growth directions, so the orientation defects do not intrude into the display region 1a.

6 Claims, 7 Drawing Sheets

LIQUID CRYSTAL DISPLAY DEVICE AND ORIENTATION PROCESSING METHOD

This is a continuation filed under 35 U.S.C. §111(a), of International Application No. PCT/JP2005/004517, filed Mar. 15, 2005, and which designated the United States of America.

TECHNICAL FIELD

The present invention relates to a liquid crystal display device that controls the light transmission of liquid crystal material by applying voltage and displays an image and an orientation processing method for the liquid crystal display device, and more particularly to a liquid crystal display device and orientation processing method that suppress the intrusion of orientation defects into a display region.

BACKGROUND ART

Recently, liquid crystal display devices are widely used in various equipments due to their low power consumption and portability. Particularly, liquid crystal display devices that use ferroelectric liquid crystal as the liquid crystal material are suitable for moving image displays because of their fast speed of response. However, when ferroelectric liquid crystal is used, the liquid crystal phase takes on a layered structure, and that layered structure is broken down by external force, so is disadvantageous in that the panel construction is weak. Therefore, typically, in the case of a liquid crystal display device in which ferroelectric liquid crystal is placed between two substrates so that the liquid crystal phase has a layered structure, a spacer and seal are placed between the substrates so that the layered structure is capable of withstanding external force (for example, refer to Patent Documents 1 and 2).

[Patent Document 1] Japanese patent application Laid-Open No. 2001-108999.

[Patent Document 2] Japanese patent application Laid-Open No. 2001-337352.

DISCLOSURE OF THE INVENTION

Problems to be Solved by the Invention

In the case of using this kind of spacer and seal, stress is applied to the liquid crystal phase due to differences in the physical properties of the material of the spacer and seal and the liquid crystal material (particularly difference in linear expansion coefficient), and orientation defects occur. The occurrence of orientation defects is notably seen in the sealed portion in which two substrates are essentially fixed together by the seal. When an orientation defect that occurs in the sealed portion intrudes into the display region, the display quality deteriorates greatly, so measures to prevent this kind of orientation defect are desired.

Therefore, in order that orientation defects do not intrude into the display region, a method of not using the transmission region of the orientation defects from the sealed portion as part of the display region is possible. However, in this method, the frame region of the liquid crystal display device becomes large, so there is a problem in that overall surface area becomes large due to the width of the display region, and thus the size of the liquid crystal display device becomes large.

Taking the aforementioned problems into consideration, it is an object of the present invention to provide a liquid crystal display device and orientation processing method that are capable of suppressing the intrusion of orientation defects into the display region.

Means for Solving the Problems

The liquid crystal display device of the present invention is a liquid crystal display device having a plurality of substrates with rubbed orientation films that are made to face each other and liquid crystal material that is filled into a space between the substrates, and comprising a region that is located around the outside of a display region and that has an orientation state with optical characteristics that are inverted with respect to the rubbing direction.

The direction in which orientation defects are generated is the direction of the liquid crystal layer, and this direction is set according to the orientation processing conditions. Also, it is presumed that orientation defects travel from the seal section in a direction parallel to the direction of the liquid crystal layer and try to intrude into the display region, however, they are not inverted and do not branch out. Taking advantage of the characteristics of orientation defects, in the liquid crystal display device of this invention, a region that is formed around the outside of the display region and that has an orientation state with optical characteristics that are inverted with respect to the rubbing direction of the display area changes the direction of the orientation defects so that the orientation defects do not enter into the display region.

The liquid crystal display device of the present invention is a liquid crystal display device having a plurality of substrates with rubbed orientation films that are made to face each other and liquid crystal material that is filled into a space between the substrates, comprising: a first region that is located around the outside of a display region and that has an orientation state that is equivalent to that of the display region; and a second region that is located around the outside of the first region and that has an orientation state with optical characteristics that are inverted with respect to the rubbing direction.

In the liquid crystal display device of the present invention, the first region that is located around the outside of the display region and that has an orientation state that is equivalent to that of the display region, and the second region that is located around the outside of the first region and that has an orientation state with optical characteristics that are inverted with respect to the rubbing direction of the display region control the direction of the orientation defects so that the orientation defects do not enter into the display region.

In the liquid crystal display device of the present invention the first region and the second region both have a bipectinate shape.

In the liquid crystal display device of the present invention, orientation defects advance in a zigzag pattern inside the first and second regions around the outside of the display region, so do not intrude into the display region.

The liquid crystal display device of the present invention comprises a barrier that is formed around the outside of the display region and that extends in a direction parallel with the rubbing direction.

In the liquid crystal display device of the invention, intrusion of orientation defects into the display region is suppressed by the barrier.

In the liquid crystal display device of the present invention, an end section of the barrier extends at least to the inside of the second region.

In the liquid crystal display device of the invention, the end section of the barrier extends inside the second region or up to the outside of the second region, and the orientation defects that are generated from the end section of the barrier are prevented from entering into the display region.

The liquid crystal display device of the present invention is a liquid crystal display device having a first substrate on which pixel electrodes and switching elements that are connected to the pixel electrodes are formed and which is made to face a second substrate on which a common electrode is formed, and liquid crystal material that is filled into a space between the first and second substrates, comprising: a first electrode that is located around the outside of a display region formed on the first substrate and that generates an orientation state that is equivalent to that of the display region; and a second electrode that is located around the outside of the first electrode on the first substrate and that generates an orientation state that is opposite to that of the display region.

The liquid crystal display device of the present invention is a liquid crystal display device having a first substrate on which pixel electrodes and switching elements that are connected to the pixel electrodes are formed and which is made to face a second substrate on which a common electrode is formed, and liquid crystal material that is filled into a space between the first and second substrates, comprising: a first electrode that is located around the outside of a display region formed on the second substrate and that generates an orientation state that is equivalent to that of the display region; and a second electrode that is located around the outside of the first electrode on the second substrate and that generates an orientation state that is opposite to that of the display region.

In the liquid crystal display device of the invention, a voltage having the same polarity as that of the display region is applied to the first electrode that is located on the first or second substrate, and a voltage having polarity that is opposite to that of the display region is applied to the second electrode that is located on the first or second substrate. Therefore, it is easy to form a region having an orientation state that is equivalent to that of the display region, and a region having an orientation state that has characteristics that are opposite to those of the display region.

The orientation processing method of the present invention is an orientation processing method for performing orientation of a liquid crystal display device having a first substrate on which pixel electrodes and switching elements that are connected to the pixel electrodes are formed and which is made to face a second substrate on which a common electrode is formed, and liquid crystal material that is filled into a space between the first and second substrates, comprising steps of: forming a first electrode around the outside of a display region on the first substrate so that it generates an orientation state that is equivalent to that of the display region; forming a second electrode around the outside of the first electrode on the first substrate so that it generates an orientation state that is opposite to that of the display region; and applying a voltage having one polarity to the common electrode and the first electrode during orientation process, and applying a voltage having the other polarity to the second electrode during orientation process.

The orientation processing method of the present invention is an orientation processing method for performing orientation of a liquid crystal display device having a first substrate on which pixel electrodes and switching elements that are connected to the pixel electrodes are formed and which is made to face a second substrate on which a common electrode is formed, and liquid crystal material that is filled into a space between the first and second substrates, comprising steps of: forming a first electrode around the outside of a display region on the second substrate so that it generates an orientation state that is equivalent to that of the display region; forming a second electrode around the outside of the first electrode on the second substrate so that it generates an orientation state that is opposite to that of the display region; and applying a voltage having one polarity to the common electrode and the first electrode during orientation process, and applying a voltage having the other polarity to the second electrode during orientation process.

In the orientation processing method of the invention, during the orientation process, a voltage having one polarity is applied to the common electrode and the first electrode located around the outside of the display region, and a voltage having the other polarity is applied to the second electrode located around the outside of the first electrode. Therefore, by a simple procedure, it is possible to obtain an orientation state around the outside of the display region that is equivalent to that of the display region, and to obtain an orientation state around that orientation state that has characteristics that are opposite to those of the display region.

EFFECTS OF THE INVENTION

In the present invention, since a region which has an orientation state with optical characteristics opposite to those of the display region is located around the outside of the display region, the direction of liquid crystal layer is inverted with respect to the rubbing direction. Therefore, it is possible to control the propagation direction of stress from the seal which is a cause for the generation of orientation defects, to suppress the intrusion of orientation defects into the display region, and to prevent a deterioration of picture quality due to orientation defects.

DESCRIPTION OF THE NUMERALS

Figure 1:
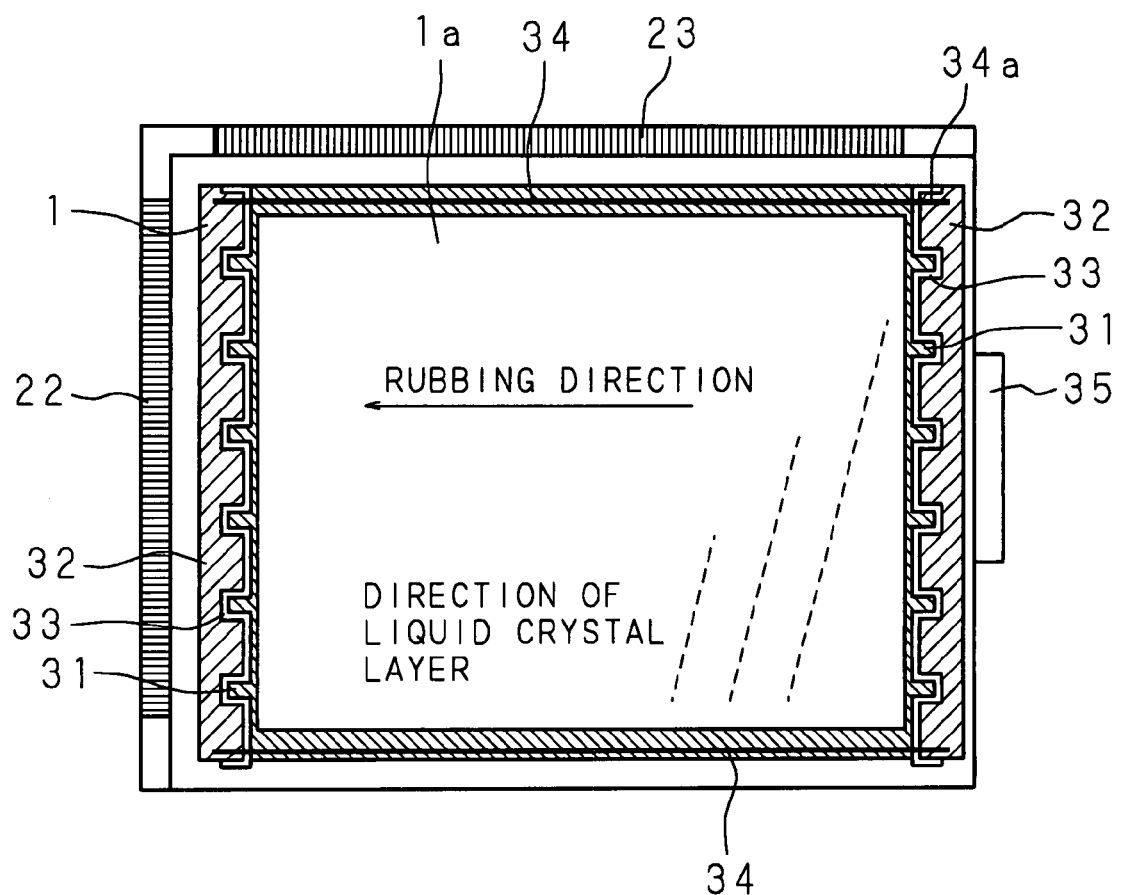
FIG. 1 is an exploded plan view of a liquid crystal display device of the present invention.

1 Liquid crystal panel
1a Display region
2 Glass substrate (first substrate)
3 Glass substrate (second substrate)
4 Pixel electrode
5 Opposing electrode
9 Seal
10 Liquid crystal layer
21 TFT
31 Peripheral electrode (first electrode)
32 Inverted electrode (second electrode)
33 Buffer region
34 Barrier
34a End section

BEST MODES FOR IMPLEMENTING THE INVENTION

The best modes of the present invention will be explained in detail with reference to the supplied drawings. The present invention is not limited to the best modes described below.

Figure 2:
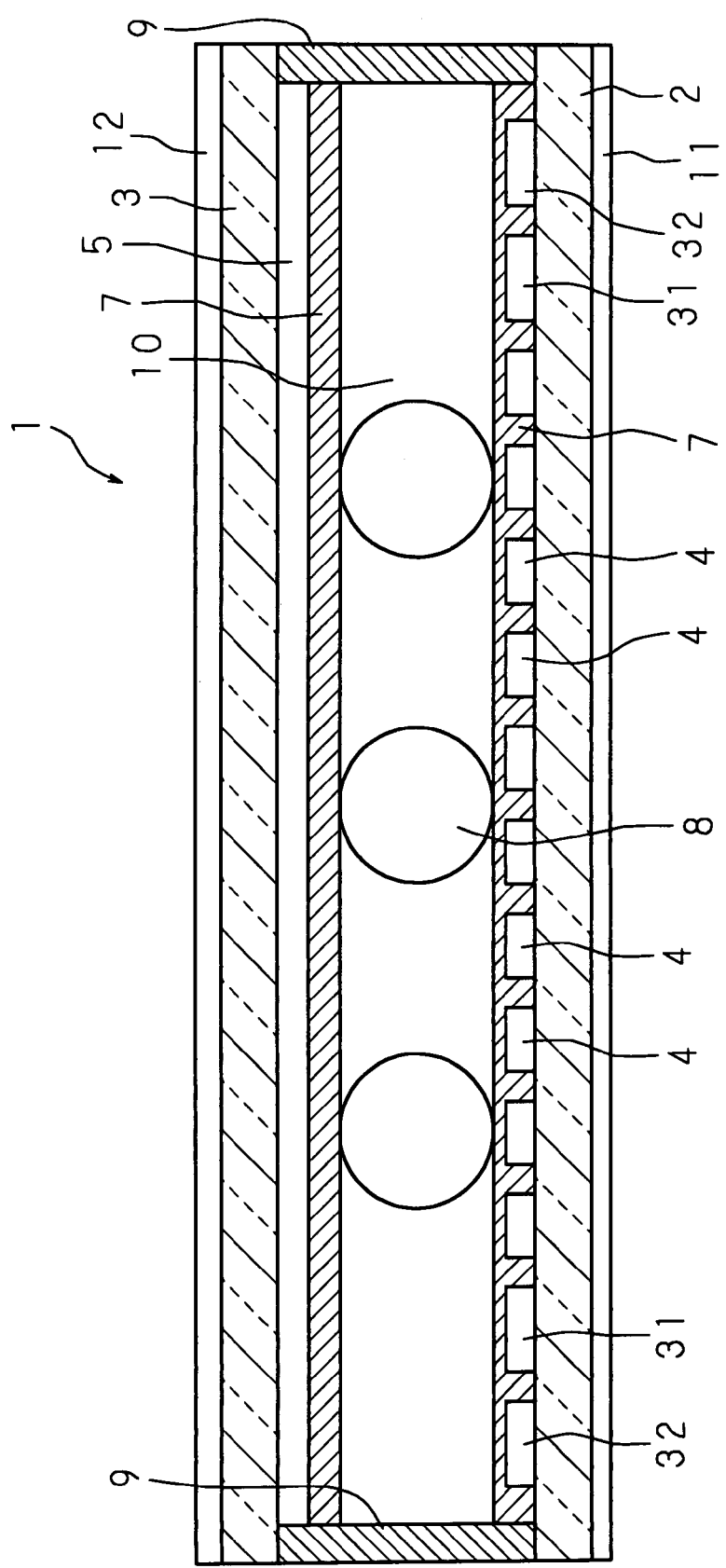
FIG. 2 is a sectional view of a liquid crystal panel.

FIG. 1 is an exploded plan view of the liquid crystal display device of the present invention; FIG. 2 is a sectional view of a liquid crystal panel; and FIG. 3 is a schematic plan view of the liquid crystal panel.

As shown in FIG. 2, a liquid crystal panel 1 comprises: a glass substrate 2 as a first substrate having pixel electrodes 4 which are arranged in a matrix form and TFTs 21 (see FIG. 2) each of which is connected to each of the pixel electrodes 4, and a glass substrate 3 as a second substrate having a flat shaped opposing electrode 5. An orientation film 6 and orientation film 7 are formed over the pixel electrodes 4 and opposing electrode 5, respectively. Spacers 8 are evenly spaced between the glass substrates 2, 3 in order to maintain a uniform gap between the inner surfaces of the glass substrates 2, 3, and a seal 9 made of a thermosetting resin is located around the edge of the liquid crystal panel 1. These spacers 8 and seal 9 form a space having a specified length between the glass substrates 2, 3, ferroelectric liquid crystal is filled inside this space to form a liquid-crystal layer 10. Furthermore, a polarization plate 11 and polarization plate 12 are located on the outer surfaces of the glass substrate 2 and glass substrate 3, respectively.

Figure 3:
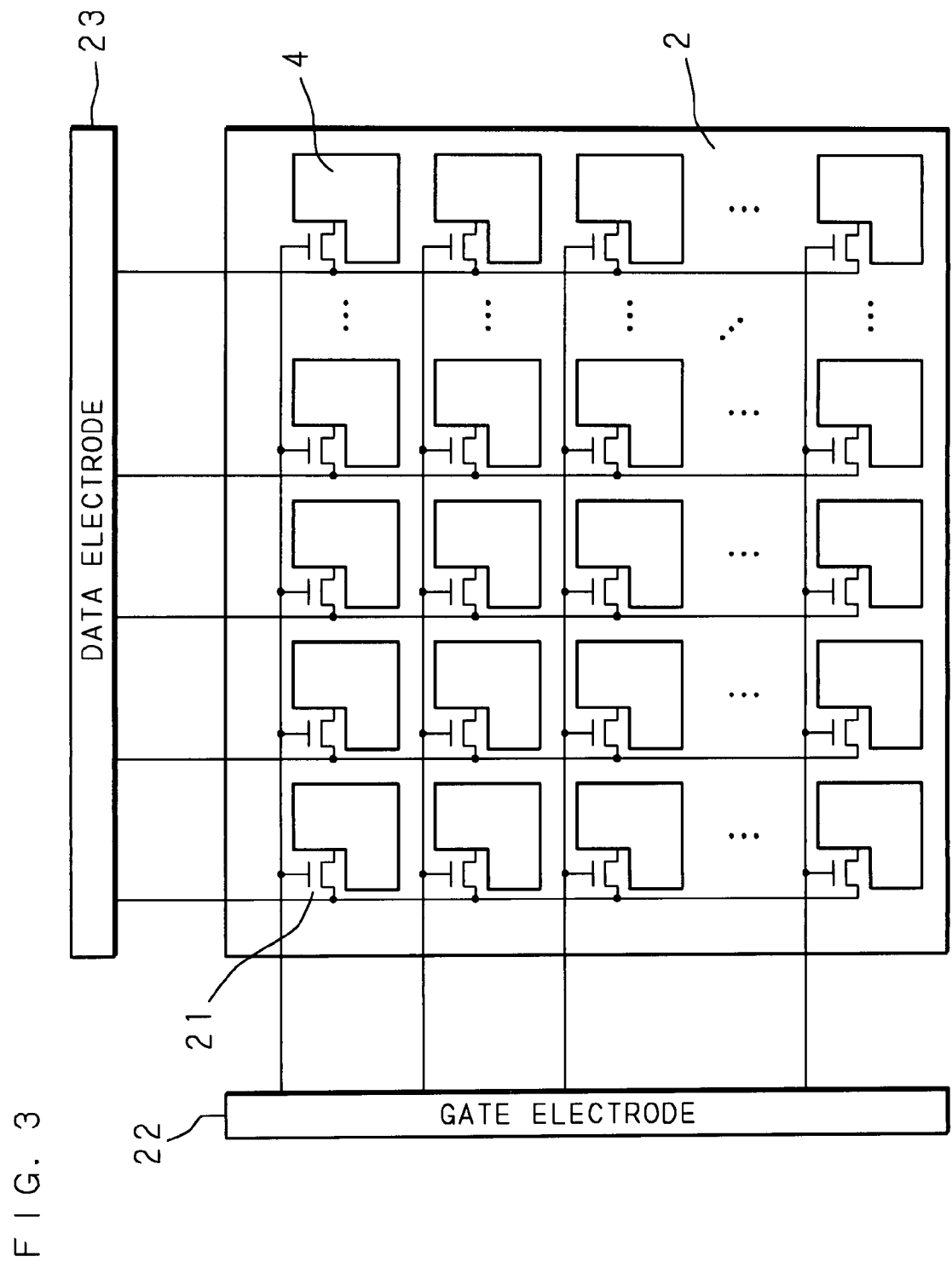
FIG. 3 is a schematic plan view of a liquid crystal panel.

As shown in FIG. 3, the pixel electrodes 4 and TFTs 21 are arranged in a matrix form on the glass substrate 2, and each pixel electrode 4 is connected to the drain terminal of TFT 21. The gate terminals of the TFTs 21 are connected to a gate electrode 22, and the source terminals of the TFTs 21 are connected to a data electrode 23.

Also, as shown in FIG. 2, a peripheral electrode 31 for generating an orientation state that is equivalent to that of the display region is located as a first electrode at the outside of the pixel electrodes 4 of the glass substrate 2, and an inverted electrode 32 for generating an orientation state having polarity that is opposite to that of the display region is located as a second electrode at the outside of the peripheral electrode 31. As shown in FIG. 1, the peripheral electrode 31 is located around both the long side regions and short side regions of the rectangular shaped liquid crystal panel 1, and the inverted electrode 32 is located on only the short side regions of the liquid crystal panel 1. In the short side regions, the peripheral electrode 31 and the inverted electrode 32 are located with a bipectinate shape. A buffer region 33 that has no orientation is located between the peripheral electrode 31 and inverted electrode 32.

The internal region that is surrounded by the peripheral electrode 31 becomes a display region 1a of the liquid crystal panel 1. The rubbing direction is in the direction parallel with the long sides of the liquid crystal panel 1 (direction of the solid arrow in FIG. 1), and the direction of the liquid crystal layer is a direction that is slightly slanted from the short side sections of the liquid crystal panel 1 (direction of the dashed lines in FIG. 1). Also, by applying a voltage having the same polarity as that of the opposing electrode 5 to the peripheral electrode 31 during orientation process, it is possible to generate a region around the outside of the display region 1a having an orientation state that is equivalent to that of the display region 1a. Also, similarly, by applying a voltage having polarity that is opposite to that of the opposing electrode 5 to the inverted electrode 32 during orientation process, it is possible to further generate a region around the outside of this region having an orientation state with optical characteristics that are inverted with respect to the rubbing direction of the display region 1a.

There is a barrier 34 in the long side regions of the liquid crystal panel 1 for preventing orientation defects. The end sections 34a of the barrier 34 extend past the peripheral electrode 31 in the short side regions, and the tips ends extend inside the region of the inverted electrode 32. Also, there is an inlet 35 for liquid crystal material in one of the short side regions.

Figure 4:
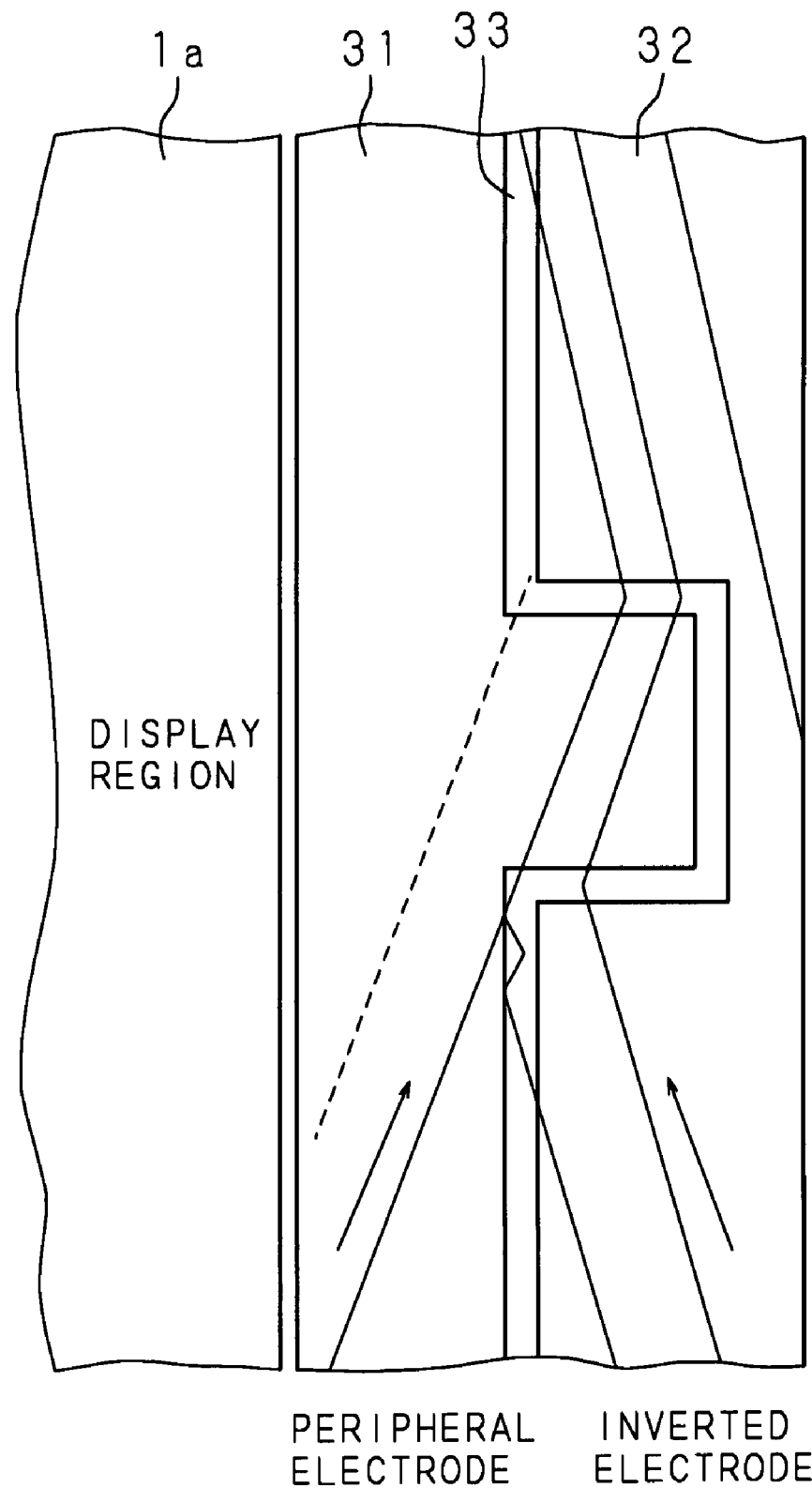
FIG. 4 is an enlarged view showing the control of orientation defects.

Controlling the orientation defects in the liquid crystal display device of the present invention that is constructed as described above is explained. FIG. 4 is an enlarged view showing this control of orientation defects. During orientation process, a voltage having the same polarity as that of the opposing electrode 5 is applied to the peripheral electrode 31, and a voltage having opposite polarity is applied to the inverted electrode 32. By doing this a region having an orientation state that is the same as that of the display region 1a is generated at the outside of the display region 1a, and at the outside of this region, a region having an orientation state with optical characteristics that are inverted with respect to the rubbing direction of the display region 1a is generated.

Orientation defects grow in the same direction (arrow direction in FIG. 4) as the direction of the liquid crystal layer (direction of the dashed line in FIG. 4). When this happens, the optical characteristics of the orientation state of the region of the peripheral electrode 31 and the region of the inverted electrode 32 are inverted, so the directions of growth of the orientation defects are different. Therefore, the orientation defects that intrude into the region of the inverted electrode 32 from the peripheral electrode 31 advance to the inside of the region of the inverted electrode 32 at an inverted angle of intrusion, and the orientation defects that intrude into the region of the peripheral electrode 31 from the inverted electrode 32 advance to the inside of the region of the peripheral electrode 31 at an inverted angle of intrusion. By repeating this kind of inversion, the orientation defects become trapped inside the buffer region 33. Therefore, orientation defects that occur near the seal 9 do not enter into the display region 1a.

Also, the end section 34a of the barrier 34 extends inside the region of the inverted electrode 32, so the direction of growth of orientation defects that occur in the regions where there is no barrier 34 is controlled by the inverted electrode 32, so the orientation defects do not intrude into the display region 1a.

Even when just the inverted electrode 32 is formed around the outside of the display region 1a and there is no peripheral electrode 31, it is still possible to suppress the intrusion of orientation defects into the display region 1a by inverting the direction of growth of the orientation defects by the inverted electrode 32.

With the liquid crystal display device of the present invention, orientation defects are controlled by the inverted electrode 32 in this way, so it is possible to easily suppress the intrusion of orientation defects that occur near the seal into the display region 1a without having to increase the size of the frame region. As a result, it is possible to prevent a deterioration of picture quality due to orientation defects, and thus it is possible to provide a stable high quality image.

Figure 5:
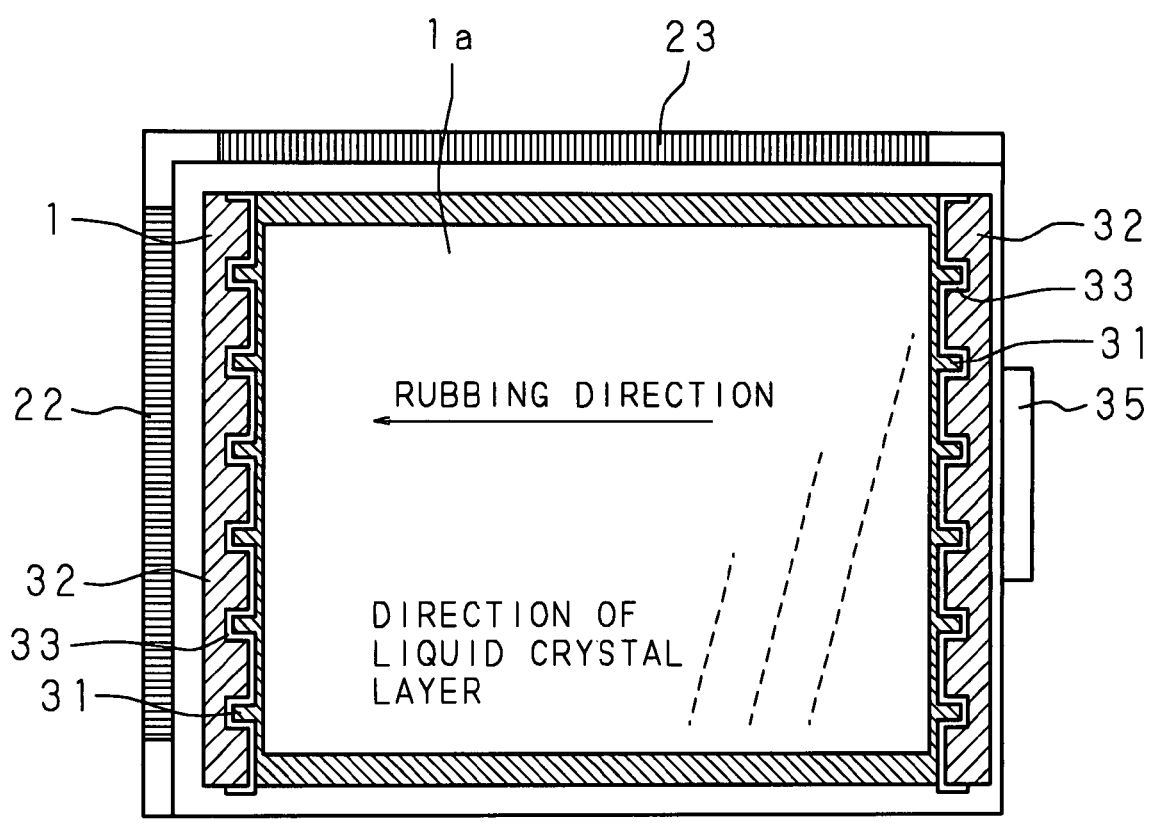
FIG. 5 is an exploded plan view of another example of a liquid crystal display device of the invention.

FIG. 5 is an exploded plan view of another example of a liquid crystal display device of the invention, where the same reference numbers are used for parts that are identical with those shown in FIG. 1, and an explanation of them will be omitted. In this example, there is no barrier 34 formed along the long side regions of the liquid crystal panel 1. The construction shown in FIG. 5 can be used when there is no intrusion of orientation defects from the long side regions.

Figure 6:
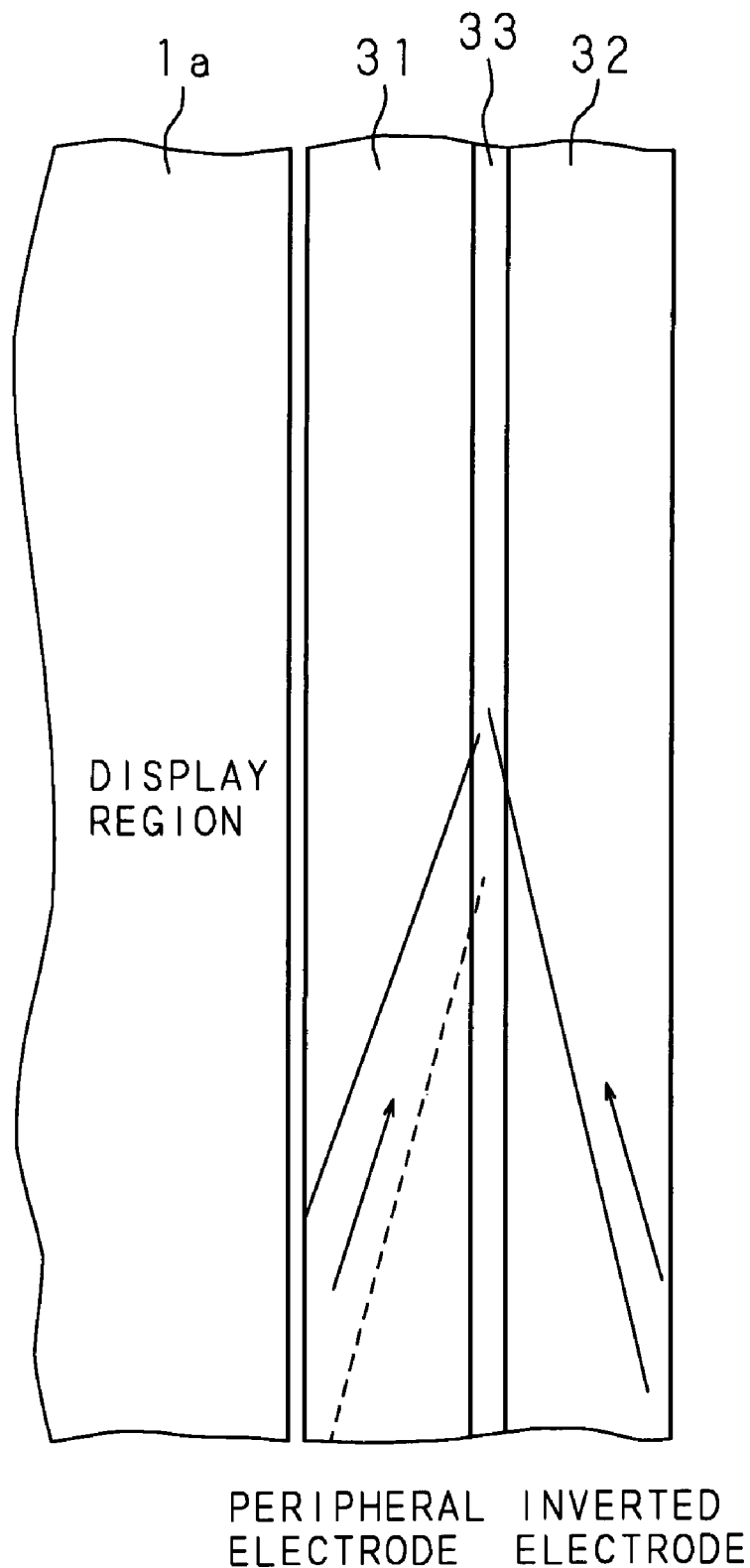
FIG. 6 is an enlarged view showing another example of the construction of a peripheral electrode and inverted electrode.

FIG. 6 is an enlarged view of another example of construction of the peripheral electrode 31 and inverted electrode 32. In this example, bipectinate construction as shown in FIG. 1 and FIG. 4 is not used, and both the peripheral electrode 31 and inverted electrode 32 are rectangular shaped and parallel with each other. In this example as well, the direction of growth of orientation defects is controlled, so orientation defects are trapped in the buffer region 33 and do not intrude into the display region 1a.

Figure 7:
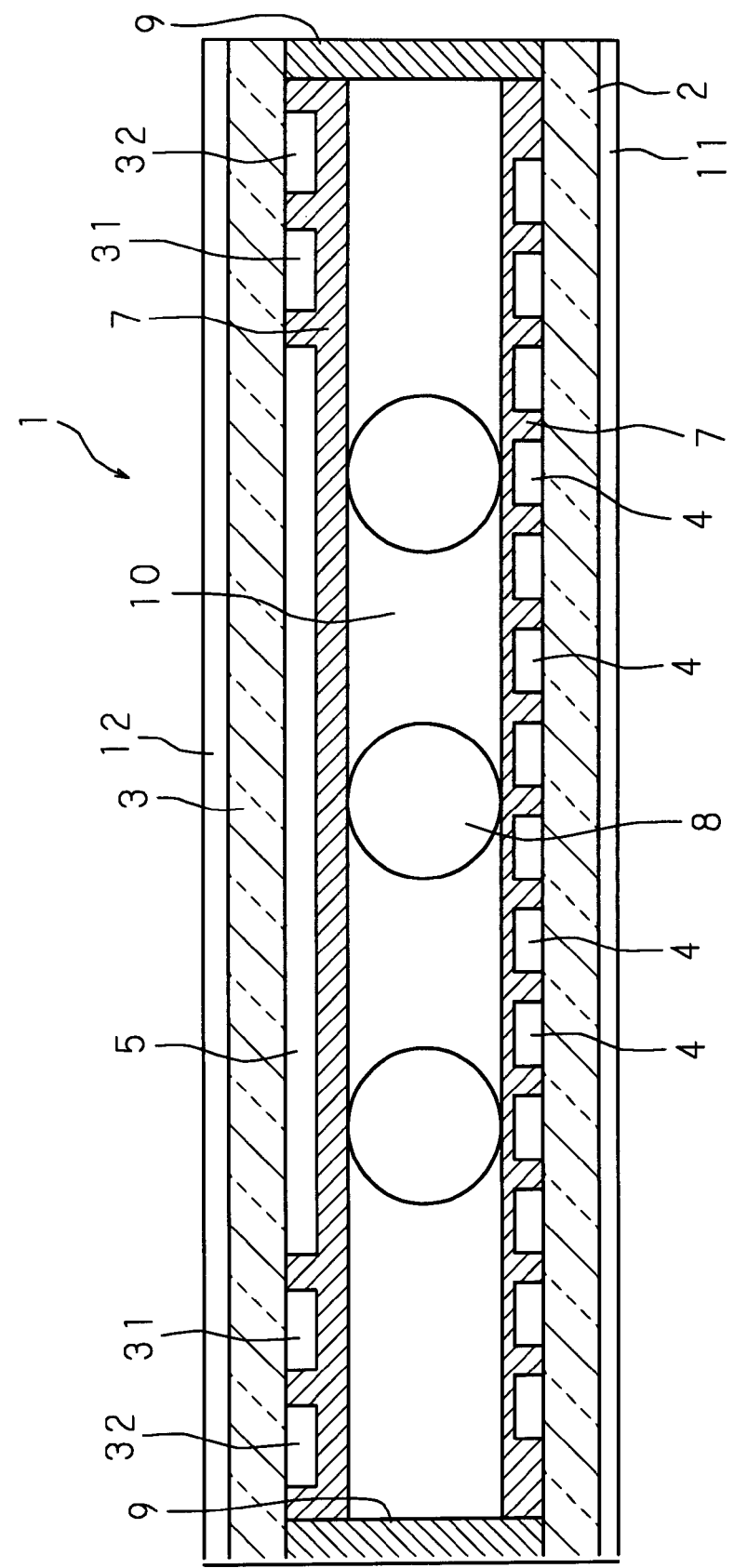
FIG. 7 is a sectional view showing another example of the construction of a liquid crystal panel.

FIG. 7 is a sectional view showing another example of the construction of a liquid crystal panel 1. This example differs from that shown in FIG. 2 in that the peripheral electrode 31 and inverted electrode 32 are formed on the glass substrate 3 that is the second substrate having the opposing electrode 5. In this example as well, orientation processing is performed in the same way as in the example shown in FIG. 2, and of course control of orientation defects is performed in the same way as in the example shown in FIG. 2.

What is claimed is:

1. A liquid crystal display device comprising:
a plurality of substrates with rubbed orientation films that are made to face each other;
liquid crystal material that is filled into a space between the substrates;
display region that is located at one of the substrates and
a region that is located around the outside of the display region and that has an orientation state with optical characteristics that are inverted with respect to the rubbing direction.

2. A liquid crystal display device comprising:
a plurality of substrates with rubbed orientation films that are made to face each other;
liquid crystal material that is filled into a space between the substrates;
display region that is located at one of the substrates
a first region that is located around the outside of the display region and that has an orientation state that is equivalent to that of the display region; and
a second region that is located around the outside of the first region and that has an orientation state with optical characteristics that are inverted with respect to the rubbing direction.

3. The liquid crystal display device of claim 2 wherein the first region and the second region both have a bipectinate shape.

4. The liquid crystal display device of claim 2 further comprising a barrier that is formed around the outside of the display region and that extends in a direction parallel with the rubbing direction.

5. The liquid crystal display device of claim 4 wherein an end section of the barrier extends at least to the inside of the second region.

6. A liquid crystal display device comprising:
a first substrate on which pixel electrodes and switching elements that are connected to the pixel electrodes are formed;
a second substrate which is made to face the first substrate and on which a common electrode is formed;
liquid crystal material that is filled into a space between the first and second substrates;
a display region that is located at the first substrate;
a first electrode that is located around the outside of the display region at the first substrate and that generates an orientation state that is equivalent to that of the display region; and
a second electrode that is located around the outside of the first electrode on the first substrate and that generates an orientation state that is opposite to that of the display region.

* * * * *